US006990456B2

(12) United States Patent
Fay et al.

(10) Patent No.: US 6,990,456 B2
(45) Date of Patent: Jan. 24, 2006

(54) ACCESSING AUDIO PROCESSING COMPONENTS IN AN AUDIO GENERATION SYSTEM

(75) Inventors: Todor J. Fay, Bellevue, WA (US); Brian L. Schmidt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 36 days.

(21) Appl. No.: 10/994,572

(22) Filed: Nov. 22, 2004

(65) Prior Publication Data

US 2005/0075882 A1  Apr. 7, 2005

Related U.S. Application Data

(63) Continuation of application No. 09/801,938, filed on Mar. 7, 2001.

(51) Int. Cl.
*G10L 15/00* (2006.01)
(52) U.S. Cl. .......................... 704/500; 84/602; 84/645
(58) Field of Classification Search ................ 704/500; 84/602, 645
See application file for complete search history.

(56) References Cited

U.S. PATENT DOCUMENTS

| | | | |
|---|---|---|---|
| 5,142,961 A | 9/1992 | Paroutaud | |
| 5,303,218 A | 4/1994 | Miyake | |
| 5,315,057 A | 5/1994 | Land et al. | |
| 5,511,002 A | 4/1996 | Milne et al. | |
| 5,548,759 A | 8/1996 | Lipe | |
| 5,717,154 A | 2/1998 | Gulick | |
| 5,734,119 A | 3/1998 | France et al. | |
| 5,761,684 A | 6/1998 | Gibson | |
| 5,792,971 A | 8/1998 | Timis et al. | |
| 5,842,014 A | 11/1998 | Brooks et al. | |
| 5,852,251 A | 12/1998 | Su et al. | |
| 5,890,017 A | 3/1999 | Tulkoff et al. | |
| 5,902,947 A | 5/1999 | Burton et al. | |
| 5,942,707 A | 8/1999 | Tamura | |
| 5,977,471 A | 11/1999 | Rosenzweig | |
| 6,100,461 A | 8/2000 | Hewitt | |
| 6,152,856 A | 11/2000 | Studor et al. | |
| 6,169,242 B1 | 1/2001 | Fay et al. | |
| 6,173,317 B1 | 1/2001 | Chaddha et al. | |

(Continued)

OTHER PUBLICATIONS

Malham et al., "3-D Sound Spatialization using Ambisonic Techniques" Computer Music Journal Winter 1995 vol. 19 No. 4 pp. 58-70.

(Continued)

*Primary Examiner*—Daniel Abebe
(74) *Attorney, Agent, or Firm*—Lee & Hayes, PLLC

(57) ABSTRACT

An application program provides a performance manager and an audio rendition manager to produce a rendition corresponding to an audio source. The performance manager receives audio data from the audio source and instantiates audio data processing components to process the audio data. The audio rendition manager receives the audio data from the performance manager and instantiates audio data processing components to further process the audio data, including a synthesizer component that generates audio sound wave data, and audio buffers that process the audio sound wave data. The audio data processing components are instantiated as objects having an interface that can be called by the application program. The application program requests a programming reference to an interface of an audio data processing component in the performance manager, or in the audio rendition manager, by calling an interface method of the performance manager or the audio rendition manager, respectively.

69 Claims, 5 Drawing Sheets

U.S. PATENT DOCUMENTS

| | | |
|---|---|---|
| 6,175,070 B1 | 1/2001 | Naples et al. |
| 6,216,149 B1 | 4/2001 | Conner et al. |
| 6,225,546 B1 | 5/2001 | Kraft et al. |
| 6,357,039 B1 | 3/2002 | Kuper |
| 6,433,266 B1 | 8/2002 | Fay et al. |
| 6,541,689 B1 | 4/2003 | Fay et al. |
| 6,658,309 B1 | 12/2003 | Abrams et al. |
| 2002/0108484 A1 | 8/2002 | Arnold et al. |

OTHER PUBLICATIONS

Stanojevic et al., "The Total Surround Sound (TSS) Processor" SMPTE Journal Nov. 1994 vol. 3 No. 11 pp. 734-740.

Berry M., "An Introduction to GrainWave" Computer Music Journal Spring 1999 vol. 23 No. 1 pp. 57-61.

Meyer D., "Signal Processing Architecture for Loudspeaker Array Directivity Control" ICASSP Mar. 1985 vol. 2 pp. 16.7.1-16.7.4.

Reilly et al. , "Interactive DSP Debugging in the Multi-Processor Huron Environment" ISSPA Aug. 1996 pp. 270-273.

Cohen et al., "Multidimensional Audio Window Management" Int. J. Man-Machine Studies 1991 vol. 34 No. 3 pp. 319-336.

Nieberle et al. ,"CAMP: Computer-Aided Music Processing" Computer Music Journal Summer 1991 vol. 15 No. 2 pp. 33-40.

Camurri et al., "A Software Architecture for Sound and Music Processing" Microprocessing and Microprogramming Sep. 1992 vol. 35 pp. 625-632.

Dannenberg et al., "Real-Time Software Synthesis on Superscalar Architectures" Computer Music Journal Fall 1997 vol. 21 No. 3 pp. 83-94.

Meeks H. ,"Sound Forge Version 4.0b" Social Science Computer Review Summer 1998 vol. 16 No. 2 pp. 205-211.

Ulianich V. ,"Project FORMUS: Sonoric Space-time and the Artistic Synthesis of Sound" Leonardo 1995 vol. 28 No. 1 pp. 63-66.

Miller et al.,"Audio-Enhanced Computer Assisted Learning and Computer Controlled Audio-Instruction", Computer Education, Pergamon Press Ltd., 1983, vol. 7, pp. 33-54.

Piche et al.,"Cecilia: A Production Interface to Csound", Computer Music Journal, Summer 1998, vol. 22, No. 2, pp. 52-55.

Harris et al.; "The Application of Embedded Transputers in a Professional Digital Audio Mixing System"; IEEE Colloquium on "Transputer Applications"; Digest No. 129, 2/1-3 (uk 13 Nov. 1989).

Moorer, James; "The Lucasfilm Audio Signal Processor"; Computer Music Journal, vol. 6, No. 3, Fall 1982, 0148-9267/82/030022-11; pp. 22 through 32.

Vercoe, Barry; "New Dimensions in Computer Music"; Trends & Perspectives in Signal Processing; Focus, Apr. 1982; pp. 15 through 23.

Vercoe, et al; "Real-Time CSOUND: Software Synthesis with Sensing and Control"; ICMC Glasgow 1990 for the Computer Music Association; pp. 209 through 211.

Waid, Fred; "APL and the Media"; Proceedings of the Tenth APL as a Tool of Thought Conference; held at Stevens Institute of Technology, Hoboken, New Jersey, Jan. 31, 1998; pp. 111 through 122.

Wippler, Jean-Claude; "Scripted Documents"; Proceedings of the 7th USENIX Tcl/TKConference; Austin Texas; Feb. 14-18, 2000; The USENIX Association.

ACCESSING AUDIO PROCESSING COMPONENTS IN AN AUDIO GENERATION SYSTEM

RELATED APPLICATIONS

This application is a continuation of and claims priority to U.S. patent application Ser. No. 09/801,938 entitled "Accessing Audio Processing Components in an Audio Generation System" filed Mar. 7, 2001 to Fay et al., the disclosure of which is incorporated by reference herein.

This application is related to U.S. patent application Ser. No. 09/801,922 entitled "Audio Generation System Manager" filed Mar. 7, 2001 to Fay et al., the disclosure of which is incorporated by reference herein.

This application is also related to U.S. patent application Ser. No. 09/802,111 entitled "Synthesizer Multi-Bus Component" filed Mar. 7, 2001 to Fay et al., the disclosure of which is incorporated by reference herein.

This application is also related to U.S. patent application Ser. No. 09/802,323 entitled "Dynamic Channel Allocation in a Synthesizer Component" filed Mar. 7, 2001 to Fay, the disclosure of which is incorporated by reference herein.

TECHNICAL FIELD

This invention relates to audio processing and, in particular, to accessing and controlling individual audio processing components within an audio generation system.

BACKGROUND

Multimedia programs present data to a user through both audio and video events while a user interacts with a program via a keyboard, joystick, or other interactive input device. A user associates elements and occurrences of a video presentation with the associated audio representation. A common implementation is to associate audio with movement of characters or objects in a video game. When a new character or object appears, the audio associated with that entity is incorporated into the overall presentation for a more dynamic representation of the video presentation.

Audio representation is an essential component of electronic and multimedia products such as computer based and stand-alone video games, computer-based slide show presentations, computer animation, and other similar products and applications. As a result, audio generating devices and components are integrated with electronic and multimedia products for composing and providing graphically associated audio representations. These audio representations can be dynamically generated and varied in response to various input parameters, real-time events, and conditions. Thus, a user can experience the sensation of live audio or musical accompaniment with a multimedia experience.

Conventionally, computer audio is produced in one of two fundamentally different ways. One way is to reproduce an audio waveform from a digital sample of an audio source which is typically stored in a wave file (i.e., a .wav file). A digital sample can reproduce any sound, and the output is very similar on all sound cards, or similar computer audio rendering devices. However, a file of digital samples consumes a substantial amount of memory and resources for streaming the audio content. As a result, the variety of audio samples that can be provided using this approach is limited. Another disadvantage of this approach is that the stored digital samples cannot be easily varied.

Another way to produce computer audio is to synthesize musical instrument sounds, typically in response to instructions in a Musical Instrument Digital Interface (MIDI) file. MIDI is a protocol for recording and playing back music and audio on digital synthesizers incorporated with computer sound cards. Rather than representing musical sound directly, MIDI transmits information and instructions about how music is produced. The MIDI command set includes note-on, note-off, key velocity, pitch bend, and other methods of controlling a synthesizer. Typically, a synthesizer is implemented in computer software, in hardware as part of a computer's internal sound card, or as an external device such as a MIDI keyboard or module. A synthesizer receives MIDI inputs on sixteen channels that conform to the MIDI standard.

The audio sound waves produced with a synthesizer are those already stored in a wavetable in the receiving instrument or sound card. A wavetable is a table of stored sound waves that are digitized samples of actual recorded sound. A wavetable can be stored in read-only memory (ROM) on a sound card chip, or provided with software. Prestoring sound waveforms in a lookup table improves rendered audio quality and throughput. An advantage of MIDI files is that they are compact and require few audio streaming resources, but the output is limited to the number of instruments available in the designated General MIDI set and in the synthesizer, and may sound very different on different computer systems.

MIDI instructions sent from one device to another indicate actions to be taken by the controlled device, such as identifying a musical instrument (e.g., piano, flute, drums, etc.) for music generation, turning on a note, and/or altering a parameter in order to generate or control a sound. In this way, MIDI instructions control the generation of sound by remote instruments without the MIDI control instructions carrying sound or digitized information. A MIDI sequencer stores, edits, and coordinates the MIDI information and instructions. A synthesizer connected to a sequencer generates audio based on the MIDI information and instructions received from the sequencer. Many sounds and sound effects are a combination of multiple simple sounds generated in response to the MIDI instructions.

MIDI inputs to a synthesizer are in the form of individual instructions, each of which designates the channel to which it applies. Within a synthesizer, instructions associated with different channels are processed in different ways, depending on the programming for the various channels. A MIDI input is typically a serial data stream that is parsed in the synthesizer into MIDI instructions and synthesizer control information. A MIDI command or instruction is represented as a data structure containing information about the sound effect or music piece such as the pitch, relative volume, duration, and the like.

A MIDI instruction, such as a "note-on", directs a synthesizer to play a particular note, or notes, on a synthesizer channel having a designated instrument. The General MIDI standard defines standard sounds that can be combined and mapped into the sixteen separate instrument and sound channels. A MIDI event on a synthesizer channel corresponds to a particular sound and can represent a keyboard key stroke, for example. The "note-on" MIDI instruction can be generated with a keyboard when a key is pressed and the "note-on" instruction is sent to the synthesizer. When the key on the keyboard is released, a corresponding "note-off" instruction is sent to stop the generation of the sound corresponding to the keyboard key.

A MIDI system allows audio and music to be represented with only a few digital samples rather than converting an analog signal to many digital samples. The MIDI standard supports different channels that can each simultaneously provide an output of audio sound wave data. There are sixteen defined MIDI channels, meaning that no more than sixteen instruments can be playing at one time. Typically, the command input for each channel represents the notes corresponding to an instrument. However, MIDI instructions can program a channel to be a particular instrument. Once programmed, the note instructions for a channel will be played or recorded as the instrument for which the channel has been programmed. During a particular piece of music, a channel can be dynamically reprogrammed to be a different instrument.

A Downloadable Sounds (DLS) standard published by the MIDI Manufacturers Association allows wavetable synthesis to be based on digital samples of audio content provided at run time rather than stored in memory. The data describing an instrument can be downloaded to a synthesizer and then played like any other MIDI instrument. Because DLS data can be distributed as part of an application, developers can be sure that the audio content will be delivered uniformly on all computer systems. Moreover, developers are not limited in their choice of instruments.

A DLS instrument is created from one or more digital samples, typically representing single pitches, which are then modified by a synthesizer to create other pitches. Multiple samples are used to make an instrument sound realistic over a wide range of pitches. DLS instruments respond to MIDI instructions and commands just like other MIDI instruments. However, a DLS instrument does not have to belong to the General MIDI set or represent a musical instrument at all. Any sound, such as a fragment of speech or a fully composed measure of music, can be associated with a DLS instrument.

A multimedia program, such as a video game, incorporates the audio rending technologies to create an audio representation corresponding to a video presentation. An application program creates an audio representation component to process audio data that correlates with the video presentation. The audio representation component creates audio data processing components to process and render the audio data. However, the application program creating the audio representation component cannot directly access the audio data processing components that are created by the audio representation component.

SUMMARY

An audio generation system includes a performance manager, which is an audio source manager, and an audio rendition manager to produce a rendition corresponding to an audio source. An application program provides the performance manager and the audio rendition manager to produce the rendition.

The performance manager receives audio content from one or more audio sources and instantiates audio data processing components to process the audio content, including audio content components corresponding to each of the audio sources. The audio content components have one or more track components that generate audio data in the form of event instructions from the received audio content. The audio data processing components also process the event instructions to produce audio data in the form of audio instructions. The performance manager provides, or routes, the audio instructions to the audio rendition manager.

The audio rendition manager instantiates audio data processing components to process the audio instructions, including a synthesizer component that generates audio sound wave data from the received audio instructions, and audio buffers that process the audio sound wave data. The components of the audio generation system, and the audio data processing components in the performance manager and in the audio rendition manager are instantiated as objects having one or more interfaces that can be called by a software component, such as the application program.

The application program can request a programming reference, such as a pointer, to an interface of an audio data processing component in the performance manager by calling an interface method of the performance manager. Similarly, the application program can request a programming reference to a interface of an audio data processing component in the audio rendition manager by calling an interface method of the audio rendition manager. The respective interface method determines the interface of a particular audio data processing component and provides a programming reference to the interface. The respective interface method also returns the requested reference to the application program, or software component, that called the interface method.

BRIEF DESCRIPTION OF THE DRAWINGS

The same numbers are used throughout the drawings to reference like features and components.

DETAILED DESCRIPTION

The following describes systems and methods to implement audio data processing components of an audio generation system, and access the audio data processing components via programming object interface methods. An audio rendition manager is instantiated as a component object which in turn instantiates various audio data processing components that process audio data into audible sound. An application program of the audio generation system can locate an application programming interface (API) of an audio data processing component in the audio rendition manager by calling an interface method of the audio rendition manager. The interface method determines the requested API of an audio data processing component and passes a reference to the API back to the application program that called the interface method.

Exemplary Audio Generation System

Figure 1:
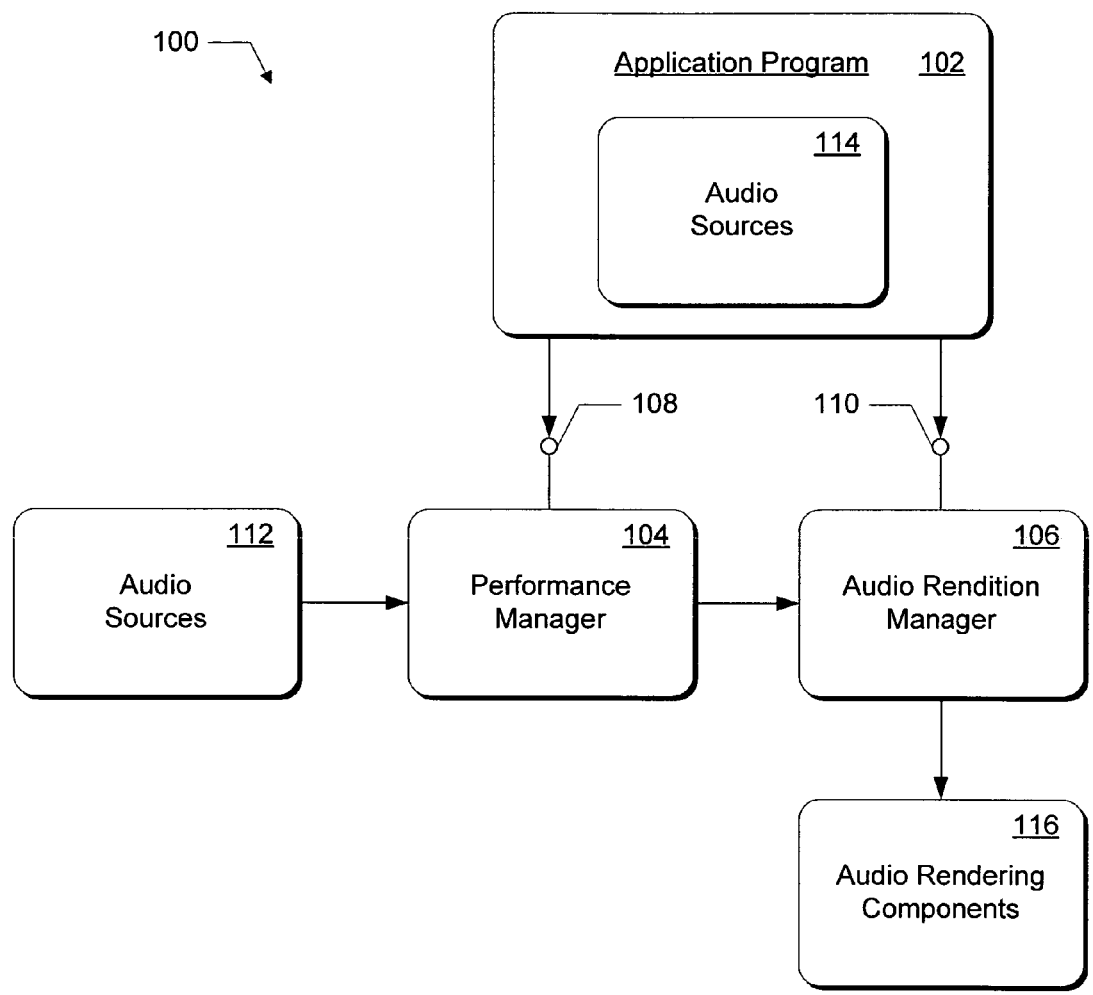
FIG. 1 is a block diagram that illustrates components of an exemplary audio generation system.

FIG. 1 illustrates an audio generation system 100 having components that can be implemented within a computing device, or the components can be distributed within a computing system having more than one computing device. The audio generation system 100 generates audio events that are processed and rendered by separate audio processing components of a computing device or system. See the description of "Exemplary Computing System and Environment" below for specific examples and implementations of network and computing systems, computing devices, and components that can be used to implement the technology described herein. Furthermore, additional information regarding the audio generation systems described herein can be found in the U.S. patent application entitled "Audio Generation System Manager", which is incorporated by reference above.

Audio generation system 100 includes an application program 102, a performance manager component 104, and an audio rendition manager 106. Application program 102 is one of a variety of different types of applications, such as a video game program, some other type of entertainment program, or any other application that incorporates an audio representation with a video presentation.

The performance manager 104 and the audio rendition manager 106 can be instantiated as component objects. The application program 102 interfaces with the performance manager 104, the audio rendition manager 106, and the other components of the audio generation system 100 via application programming interfaces (APIs). Specifically, application program 102 interfaces with the performance manager 104 via API 108 and with the audio rendition manager 106 via API 110.

The various components described herein, such as the performance manager 104 and the audio rendition manager 106, can be implemented using standard programming techniques, including the use of OLE (object linking and embedding) and COM (component object model) interfaces. COM objects are implemented in a system memory of a computing device, each object having one or more interfaces, and each interface having one or more methods. The interfaces and interface methods can be called by application programs and by other objects. The interface methods of the objects are executed by a processing unit of the computing device. Familiarity with object-based programming, and with COM objects in particular, is assumed throughout this disclosure. However, those skilled in the art will recognize that the audio generation systems and the various components described herein are not limited to a COM and/or OLE implementation, or to any other specific programming technique.

The audio generation system 100 includes audio sources 112 that provide digital samples of audio data such as from a wave file (i.e., a .wav file), message-based data such as from a MIDI file or a pre-authored segment file, or an audio sample such as a Downloadable Sound (DLS). Audio sources can be also be stored as a resource component file of an application rather than in a separate file. Audio sources 114 are incorporated with application program 102.

Application program 102 initiates that an audio source 112 and/or 114 provide audio content input to the performance manager 104. The performance manager 104 receives the audio content from the audio sources 112 and/or 114 and produces audio instructions for input to the audio rendition manager 106. The audio rendition manager 106 receives the audio instructions and generates audio sound wave data. The audio generation system 100 includes audio rendering components 116 which are hardware and/or software components, such as a speaker or soundcard, that renders audio from the audio sound wave data received from the audio rendition manager 106.

Exemplary Audio Generation System

Figure 2:
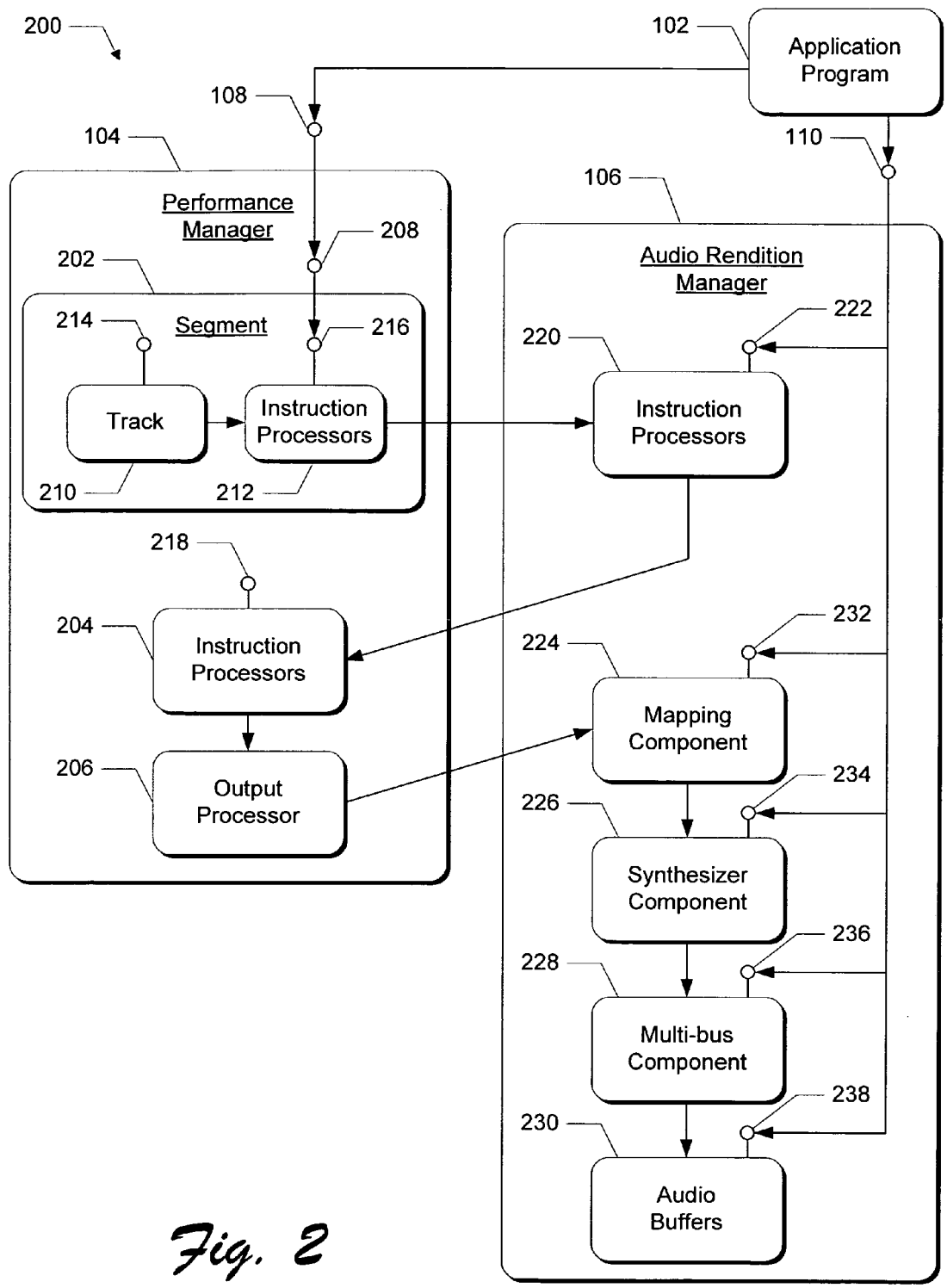
FIG. 2 is a block diagram that further illustrates components of the audio generation system shown in FIG. 1.

FIG. 2 illustrates an application program 102, a performance manager component 104, and an audio rendition manager 106 as part of an audio generation system 200. The performance manager 104 can receive audio content from a wave file (i.e., .wav file), a MIDI file, or a segment file authored with an audio production application, such as DirectMusic® Producer, for example. DirectMusic® Producer is an authoring tool for creating interactive audio content and is available from Microsoft Corporation, Redmond Wash. Additionally, the performance manager 104 can receive audio content that is composed at run-time from different audio content components.

The performance manager 104 includes a segment component 202, an instruction processors component 204, and an output processor 206. The segment component 202 is an audio content component and represents audio content input from an audio source, such as from audio source 112 (FIG. 1). Although the performance manager 104 is shown having only one segment 202, the performance manager can have a primary segment and any number of secondary segments. Multiple segments in can be arranged concurrently and/or sequentially with the performance manager 104.

Segment component 202 can be instantiated as a programming object having one or more interfaces 208 and associated interface methods. In the described embodiment, segment object 202 is an instantiation of a COM object class and represents an audio or musical piece. An audio segment represents a linear interval of audio data or a music piece and is derived from an audio source input which can be digital audio data or event-based data, such as MIDI formatted inputs.

The segment component 202 has a track component 210 and an instruction processors component 212. Although only one track component 210 is shown, a segment 202 can have any number of track components and can combine different types of audio data in the segment 202 with the different track components. Each type of audio data corresponding to a particular segment is contained in a track component in the segment. An audio segment is generated from a combination of the tracks in the segment.

The segment component 202 contains references to the track component 210. The track component 210 can be instantiated as a programming object having one or more interfaces 214 and associated interface methods. Track objects are played together in a segment to render the audio and/or musical piece represented by the segment object which is part of a larger overall performance. When first instantiated, a track object does not contain actual music or audio performance data (such as a MIDI instruction sequence). However, each track object has a stream input/output (I/O) interface method through which audio data is specified.

The track component 210 generates event instructions for audio and music generation components when the performance manager 104 plays the segment 202. Audio data is routed through the components in the performance manager 104 in the form of event instructions which contain information about the timing and routing of the audio data. The event instructions are routed between and through the components in the performance manager 204 on designated performance channels. The performance channels are allocated as needed to accommodate any number of audio input sources and routing event instructions.

To play a particular audio or musical piece, performance manager 104 calls segment object 202 and specifies a time interval or duration within the musical segment. The segment object in turn calls the track play method of track 210, specifying the same time interval. The track object responds by independently rendering event instructions at the specified interval. This is repeated, designating subsequent intervals, until the segment has finished its playback. A segment state is an instance of a segment that is playing, and is instantiated as a programming object. The audio content contained within a segment is played by the performance manager on an audio rendition manager, which is a segment state of the segment.

The event instructions generated by track component 210 in segment component 202 are input to the instruction processors component 212 in the segment. The instruction processors component 212 can also be instantiated as a programming object having one or more interfaces 216 and associated interface methods. The instruction processors component 212 has any number of individual event instruction processors (not shown) and represents the concept of a graph that specifies the logical relationship of an individual event instruction processor to another in the instruction processors component. An instruction processor can modify an event instruction and pass it on, delete it, or send a new instruction.

The instruction processors component 204 in the performance manager 104 also processes, or modifies, the event instructions. The instruction processors component 204 can also be instantiated as a programming object having one or more interfaces 218 and associated interface methods, and has any number of individual event instruction processors. The event instructions are routed from the performance manager instruction processors component 204 to the output processor 206 which converts the event instructions to MIDI formatted audio instructions. The audio instructions are then provided, or routed, to the audio rendition manager 106.

The audio rendition manager 106 processes audio data to produce one or more instances of a rendition corresponding to an audio source, or audio sources. That is, audio content from multiple sources can be processed and played on a single audio rendition manager 106 simultaneously. Rather than allocating a buffer and hardware audio channels for each sound, an audio rendition manager 106 can be created to process multiple sounds from multiple sources. Additionally, the audio rendition manager 106 dynamically allocates hardware channels as needed and can render more than one sound through a single hardware channel because multiple audio events are pre-mixed before being rendered via a hardware channel.

The audio rendition manager 106 has an instruction processors component 220 that receives event instructions from the output of the instruction processors component 212 in segment component 202 in the performance manager 104. The instruction processors component 220 in the audio rendition manager 106 is also a graph of individual event instruction modifiers that process event instructions. Although not shown, the instruction processors component 220 can receive event instructions from any number of segment outputs. Additionally, the instruction processors component 220 can be instantiated as a programming object having one or more interfaces 222 and associated interface methods, and is instantiated by the audio rendition manager 106 when the audio rendition manager is itself created.

The audio rendition manager 106 also includes several audio data processing components that are logically related to process the audio instructions received from the output processor 206 of the performance manager 104. The audio data processing components represent the concept of a graph that specifies the logical relationship of one audio data processing component to another in the audio rendition manager.

The logical configuration of the audio data processing components defines the flow of audio data throughout the audio rendition manager. The audio rendition manager 106 has a mapping component 224, a synthesizer component 226, a multi-bus component 228, and an audio buffers component 230. Each of the audio data processing components in the audio rendition manager 106 can be instantiated by the audio rendition manager when the audio rendition manager is itself created.

Mapping component 224 can be instantiated as a programming object having one or more interfaces 232 and associated interface methods. The mapping component 224 maps the audio instructions received from the output processor 206 in the performance manager 104 to the synthesizer component 226. Although not shown, an audio rendition manager can have more than one synthesizer component. The mapping component 224 allows audio instructions from multiple sources (e.g., multiple performance channel outputs from the output processor 206) to be input to one or more synthesizer components 226 in the audio rendition manager 106.

The synthesizer component 226 can be instantiated as a programming object having one or more interfaces 234 and associated interface methods. The synthesizer component 226 receives the audio instructions from the output processor 206 via the mapping component 224. The synthesizer component 226 generates audio sound wave data from stored wavetable data in accordance with the received MIDI formatted audio instructions. Audio instructions received by the audio rendition manager 106 that are already in the form of audio wave data are mapped through to the synthesizer component 226, but are not synthesized.

A segment component 202 that corresponds to audio content from a wave file is played by the performance manager 104 like any other segment. The audio data from a wave file is routed through the components of the performance manager 104 on designated performance channels and is routed to the audio rendition manager 106 along with the MIDI formatted audio instructions. Although the audio content from a wave file is not synthesized, it is routed through the synthesizer component 226 and can be processed by MIDI controllers in the synthesizer.

The multi-bus component 228 can be instantiated as a programming object having one or more interfaces 236 and associated interface methods. The multi-bus component 228 routes the audio wave data from the synthesizer component 226 to the audio buffers component 230. The multi-bus component 228 is implemented to represent actual studio audio mixing. In a studio, various audio sources such as instruments, vocals, and the like (which can also be outputs of a synthesizer) are input to a multi-channel mixing board that then routes the audio through various effects (e.g., audio processors), and then mixes the audio into the two channels that are a stereo signal.

The audio buffers component 230 can be instantiated as a programming object having one or more interfaces 238 and associated interface methods. The audio buffers component 230 receives the audio wave data from the synthesizer component 226 via the multi-bus component 228. Individual audio buffers in the audio buffers component 230 receive the audio wave data and stream the audio wave data in real-time to an audio rendering device, such as a sound card, that produces the rendition represented by the audio rendition manager 106 as audible sound.

Exemplary Audio Rendition Components

Figure 3:
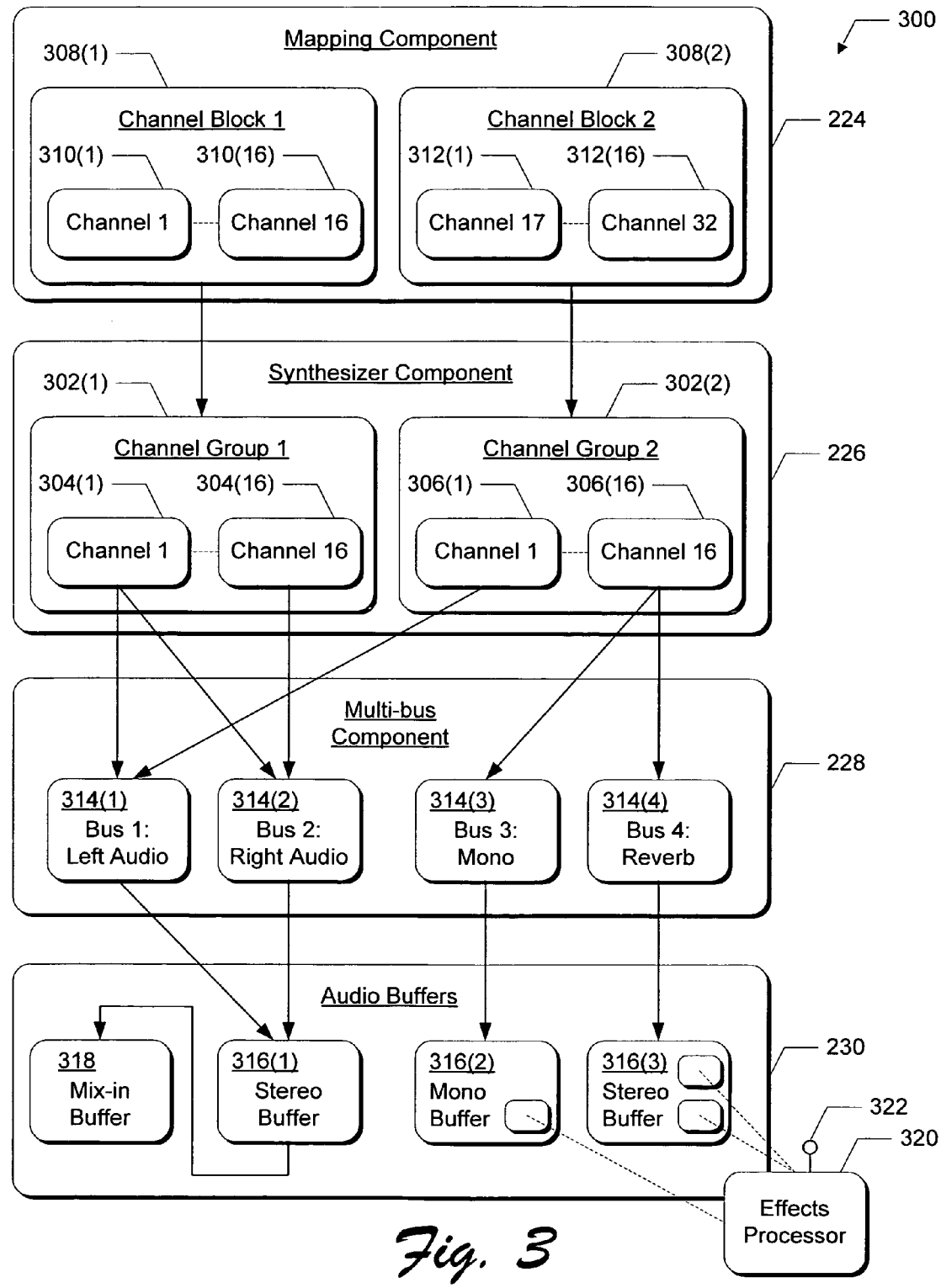
FIG. 3 is a block diagram that further illustrates components of the audio generation system shown in FIG. 2.

FIG. 3 illustrates a component relationship 300 of various audio data processing components in the audio rendition manager 206 in accordance with an implementation of the audio generation systems described herein. Details of the mapping component 224, synthesizer component 226, multi-bus component 228, and the audio buffers component 230 are illustrated, as well as a logical flow of audio data instructions through the components. Additional information regarding the audio data processing components described herein can be found in the concurrently-filed U.S. patent applications entitled "Dynamic Channel Allocation in a Synthesizer Component" and "Synthesizer Multi-Bus Component", both of which are incorporated by reference above.

The synthesizer component 226 has two channel groups 302(1) and 302(2), each having sixteen MIDI channels 304(1–16) and 306(1–16), respectively. Those skilled in the art will recognize that a group of sixteen MIDI channels can be identified as channels zero through fifteen (0–15). For consistency and explanation clarity, groups of sixteen MIDI channels described herein are designated in logical groups of one through sixteen (1–16). A synthesizer channel is a communications path in the synthesizer component 226 represented by a channel object. A channel object has APIs and associated interface methods to receive and process MIDI formatted audio instructions to generate audio wave data that is output by the synthesizer channels.

To support the MIDI standard, and at the same time make more MIDI channels available in a synthesizer to receive MIDI inputs, channel groups are dynamically created as needed. Up to 65,536 channel groups, each containing sixteen channels, can be created and can exist at any one time for a total of over one million channels in a synthesizer component. The MIDI channels are also dynamically allocated in one or more synthesizers to receive multiple audio instruction inputs. The multiple inputs can then be processed at the same time without channel overlapping and without channel clashing. For example, two MIDI input sources can have MIDI channel designations that designate the same MIDI channel, or channels. When audio instructions from one or more sources designate the same MIDI channel, or channels, the audio instructions are routed to a synthesizer channel 304 or 306 in different channel groups 302(1) or 302(2), respectively.

The mapping component 224 has two channel blocks 308(1) and 308(2), each having sixteen mapping channels to receive audio instructions from the output processor 206 in the performance manager 104. The first channel block 308(1) has sixteen mapping channels 310(1–16) and the second channel block 308(2) has sixteen mapping channels 312(1–16). The channel blocks 308 are dynamically created as needed to receive the audio instructions. The channel blocks 308 each have sixteen channels to support the MIDI standard and the mapping channels are identified sequentially. For example, the first channel block 308(1) has mapping channels 1–16 and the second channel block 308(2) has mapping channels 17–32. A subsequent third channel block would have sixteen mapping channels 33–48.

Each channel block 308 corresponds to a synthesizer channel group 302, and each mapping channel in a channel block maps directly to a synthesizer channel in the synthesizer channel group. For example, the first channel block 308(1) corresponds to the first channel group 302(1) in synthesizer component 226. Each mapping channel 310 (1–16) in the first channel block 308(1) corresponds to each of the sixteen synthesizer channels 304(1–16) in channel group 302(1). Additionally, channel block 308(2) corresponds to the second channel group 302(2) in the synthesizer component 226. A third channel block can be created in the mapping component 224 to correspond to a first channel group in a second synthesizer component (not shown).

Mapping component 224 allows multiple audio instruction sources to share available synthesizer channels, and dynamically allocating synthesizer channels allows multiple source inputs at any one time. The mapping component 224 receives the audio instructions from the output processor 206 in the performance manager 104 so as to conserve system resources such that synthesizer channel groups are allocated only as needed. For example, the mapping component 224 can receive a first set of audio instructions on mapping channels 310 in the first channel block 308 that designate MIDI channels 1, 2, and 4 which are then routed to synthesizer channels 304(1), 304(2), and 304(4), respectively, in the first channel group 302(1).

When the mapping component 224 receives a second set of audio instructions that designate MIDI channels 1, 2, 3, and 10, the mapping component 224 routes the audio instructions to synthesizer channels 304 in the first channel group 302(1) that are not currently in use, and then to synthesizer channels 306 in the second channel group 302 (2). That is, the audio instruction that designates MIDI channel 1 is routed to synthesizer channel 306(1) in the second channel group 302(2) because the first MIDI channel 304(1) in the first channel group 302(1) already has an input from the first set of audio instructions. Similarly, the audio instruction that designates MIDI channel 2 is routed to synthesizer channel 306(2) in the second channel group 302(2) because the second MIDI channel 304(2) in the first channel group 302(1) already has an input. The mapping component 224 routes the audio instruction that designates MIDI channel 3 to synthesizer channel 304(3) in the first channel group 302(1) because the channel is available and not currently in use. Similarly, the audio instruction that designates MIDI channel 10 is routed to synthesizer channel 304(10) in the first channel group 302(1).

When particular synthesizer channels are no longer needed to receive MIDI inputs, the resources allocated to create the synthesizer channels are released as well as the resources allocated to create the channel group containing the synthesizer channels. Similarly, when unused synthesizer channels are released, the resources allocated to create the channel block corresponding to the synthesizer channel group are released to conserve resources.

Multi-bus component 228 has multiple logical buses 314(1–4). A logical bus 314 is a logic connection or data communication path for audio wave data received from the synthesizer component 226. The logical buses 314 receive audio wave data from the synthesizer channels 304 and 306 and route the audio wave data to the audio buffers component 230. Although the multi-bus component 228 is shown having only four logical buses 314(1–4), it is to be appreciated that the logical buses are dynamically allocated as needed, and released when no longer needed. Thus, the multi-bus component 228 can support any number of logical buses at any one time as needed to route audio wave data from the synthesizer component 226 to the audio buffers component 230.

The audio buffers component 230 includes three buffers 316(1–3) that are consumers of the audio sound wave data output by the synthesizer component 226. The buffers 316 receive the audio wave data via the logical buses 314 in the multi-bus component 228. A buffer 316 receives an input of audio wave data from one or more logical buses 314, and streams the audio wave data in real-time to a sound card or similar audio rendering device.

The audio buffers component 230 includes three types of buffers. The input buffers 316 receive the audio wave data output by the synthesizer component 226. A mix-in buffer 318 receives data from any of the other buffers, can apply effects processing, and mix the resulting wave forms. For example, mix-in buffer 318 receives an input from input buffer 316(1). A mix-in buffer 318, or mix-in buffers, can be used to apply global effects processing to one or more outputs from the input buffers 316. The outputs of the input buffers 316 and the output of the mix-in buffer 318 are input to a primary buffer (not shown) that performs a final mixing of all of the buffer outputs before sending the audio wave data to an audio rendering device.

In addition to temporarily storing the received audio wave data, an input buffer 316 and/or a mix-in buffer 318 can process the audio wave data input with various effects-processing (i.e., audio processing) components 320 before sending the data to be further processed and/or rendered as audible sound. The effects processing components 320 are created as part of a buffer 316 and 318, and a buffer can have one or more effects processing components that perform functions such as control pan, volume, 3-D spatialization, reverberation, echo, and the like.

Additionally, the effects-processing components 320 can be instantiated as programming objects in the audio buffers when the audio buffers component 230 is created by the audio rendition manager 106. The effects-processing components 320 have one or more interfaces 322 and associated interface methods that are callable by a software component to modify the effects-processing components.

The audio buffers component 230 includes a two channel stereo buffer 316(1) that receives audio wave data input from logic buses 314(1) and 314(2), a single channel mono buffer 316(2) that receives audio wave data input from logic bus 314(3), and a single channel reverb stereo buffer 316(3) that receives audio wave data input from logic bus 314(4). Each logical bus 314 has a corresponding bus function identifier that indicates the designated effects-processing function of the particular buffer 316 that receives the audio wave data output from the logical bus. For example, a bus function identifier can indicate that the audio wave data output of a corresponding logical bus will be to a buffer 316 that functions as a left audio channel such as from bus 314(1), a right audio channel such as from bus 314(2), a mono channel such as from bus 314(3), or a reverb channel such as from bus 314(4). Additionally, a logical bus can output audio wave data to a buffer that functions as a three-dimensional (3-D) audio channel, or output audio wave data to other types of effects-processing buffers.

A logical bus 314 can have more than one input, from more than one synthesizer, synthesizer channel, and/or audio source. A synthesizer component 226 can mix audio wave data by routing one output from a synthesizer channel 304 and 306 to any number of logical buses 314 in the multi-bus component 228. For example, bus 314(1) has multiple inputs from the first synthesizer channels 304(1) and 306(1) in each of the channel sets 302(1) and 302(2), respectively. Each logical bus 314 outputs audio wave data to one associated buffer 316, but a particular buffer can have more than one input from different logical buses. For example, buses 314(1) and 314(2) output audio wave data to one designated buffer. The designated buffer 316(1), however, receives the audio wave data output from both buses.

Although the audio buffers component 230 is shown having only three input buffers 316(1–3) and one mix-in buffer 318, it is to be appreciated that there can be any number of audio buffers dynamically allocated as needed to receive audio wave data at any one time. Furthermore, although the multi-bus component 228 is shown as an independent component, it can be integrated with the synthesizer component 226, or the audio buffers component 230.

Audio Generation System Component Interfaces and Methods

Embodiments of the invention are described herein with emphasis on the functionality and interaction of the various components and objects. The following sections describe specific interfaces and interface methods that are supported by the various programming objects.

An interface method, getObject (GetObjectInPath), is supported by various component objects of the audio generation system 200. The audio rendition manager 106, segment component 202, and audio buffers in the audio buffers component 230, for example, each support the getObject interface method that allows an application program 102 to access and control the audio data processing component objects. The application program 102 can get a pointer, or programming reference, to any interface (API) on any component object in the audio rendition manager while the audio data is being processed.

Real-time control of audio data processing components is needed, for example, to control an audio representation of a video game presentation when parameters that are influenced by interactivity with the video game change, such as a video entity's 3-D positioning in response to a change in a video game scene. Other examples include adjusting audio environment reverb in response to a change in a video game scene, or adjusting music transpose in response to a change in the emotional intensity of a video game scene.

Audio Rendition Manager Interface Method

An AudioPath interface (IDirectMusicAudioPath8) represents the routing of audio data from a performance manager component to the various audio data processing components that comprise an audio rendition manager. The AudioPath interface includes the getObject method and accepts the following parameters to request a pointer, or programming reference, to an API for a component object:

dwStage is a component identifier parameter that identifies a particular audio data processing component having the requested API, such as a component in the performance manager 104 or audio rendition manager 106. The dwStage parameter can be one of the following values to indicate the component object:

"AudioPath_Graph" searches for an instruction processors component, such as instruction processors component 220 in the audio rendition manager 106. If an instruction processors component does not exist in the audio rendition manager, one is created.

"AudioPath_Tool" searches for a particular instruction processor in an instruction processors component, such as in instruction processors component 220 in the audio rendition manager 106.

"Buffer" searches for an input audio buffer, such as input audio buffer 316 in the audio buffers component 230.

"Buffer_DMO" searches for an effects processor in an input audio buffer, such as effects processor 320 in an input audio buffer 316 in the audio buffers component 230 ("DMO" is a direct music object, e.g., an effects processor).

"Mixin_Buffer" searches for a mix-in audio buffer, such as mix-in audio buffer 318 in the audio buffers component 230.

"Mixin_Buffer_DMO" searches for an effects processor in a mix-in audio buffer, such as an effects processor 320 in a mix-in audio buffer 318 in the audio buffers component 230.

"Performance" searches for a performance manager component, such as performance manager 104.

"Performance_Graph" searches for an instruction processors component, such as instruction processors component 204 in the performance manager 104. If an instruction processors component does not exist in the performance manager, one is created.

"Performance_Tool" searches for a particular instruction processor in an instruction processors component, such as in instruction processors component 204 in the performance manager 104.

"Port" searches for a synthesizer component, such as synthesizer component 226 in the audio rendition manager 106.

dwPChannel is a channel identifier parameter that identifies an audio data channel in an audio data processing component that the component object having the requested API is associated with. A value of "PChannel_All" indicates a search of all audio data channels in the audio data processing component, such as the performance manager 104 or audio rendition manager 106.

dwBuffer is an audio buffer identifier parameter that identifies a particular audio buffer, such as audio buffers 316 and 318 in the audio buffers component 230. If the dwStage parameter value is "Buffer_DMO" or "Mixin_Buffer_DMO", the audio buffer identifier indicates the audio buffer having the effects processor 320. If the dwStage parameter value is "Buffer" or "Mixin_Buffer", the audio buffer identifier indicates the audio buffer itself.

guidObject is a component class identifier parameter which is a unique identifier for the component object having the requested API, and can be an object class identifier (CLSID) of the component object. A value of "GUID_All_Objects" indicates a search for an object of any class.

dwIndex is an index parameter that indicates a particular component object having the requested API within a list of matching objects. This parameter is not used if the dwStage parameter value is "Buffer" or "Mixin_Buffer" (the parameter value for a particular audio buffer is already indicated by the dwBuffer parameter).

iidInterface is an interface identifier parameter that indicates the interface corresponding to the requested API being searched for.

ppObject is an identifier parameter that indicates a memory address of a reference to the requested programming reference.

The getObject method for the AudioPath interface returns a pointer, or programming reference, to the requested component object API. The method can also return error values to indicate that the requested API was not found. The parameters for the getObject method have a hierarchical precedence to filter out unwanted component objects when searching for a corresponding component object interface. The parameter search hierarchy is specified as dwStage, guidObject, dwPChannel, dwBuffer, and then dwIndex. Additionally, if a matching component object is located with the parameter search, but the requested API identified by iidInterface cannot be obtained, the method fails and returns an error value.

Segment Component Interface Method

A SegmentState interface (IDirectMusicSegmentState8) represents an instance of a segment in a performance manager which is comprised of multiple tracks. The SegmentState interface includes the getObject method and accepts the following parameters to request a pointer, or programming reference, to an API for a component object:

dwStage is a component identifier parameter that identifies a particular audio data processing component having the requested API, such as the performance manager 104 or a component in the performance manager, or the audio rendition manager 106 or a component in the audio rendition manager. The dwStage parameter can be one of the following values to indicate the component object:

"AudioPath" searches for an audio rendition manager on which the segment state is playing, such as audio rendition manager 106.

"AudioPath_Graph" searches for an instruction processors component, such as instruction processors component 220 in the audio rendition manager 106. If an instruction processors component does not exist in the audio rendition manager, one is created.

"AudioPath_Tool" searches for a particular instruction processor in an instruction processors component, such as in instruction processors component 220 in the audio rendition manager 106.

"Buffer" searches for an input audio buffer, such as input audio buffer 316 in the audio buffers component 230.

"Buffer_DMO" searches for an effects processor in an input audio buffer, such as effects processor 320 in an input audio buffer 316 in the audio buffers component 230 ("DMO" is a direct music object, e.g., an effects processor).

"Mixin_Buffer" searches for a mix-in audio buffer, such as mix-in audio buffer 318 in the audio buffers component 230.

"Mixin_Buffer_DMO" searches for an effects processor in a mix-in audio buffer, such as an effects processor 320 in a mix-in audio buffer 318 in the audio buffers component 230.

"Performance" searches for a performance manager component, such as performance manager 104.

"Performance_Graph" searches for an instruction processors component, such as instruction processors component 204 in the performance manager 104. If an instruction processors component does not exist in the performance manager, one is created.

"Performance_Tool" searches for a particular instruction processor in an instruction processors component, such as in instruction processors component 204 in the performance manager 104.

"Port" searches for a synthesizer component, such as synthesizer component 226 in the audio rendition manager 106.

"Segment" searches for a segment component that the segment state originates from, such as segment 202 in the performance manager 104.

"Segment_Graph" searches for an instruction processors component in a segment component, such as instruction processors component 212 in the segment 202. If an instruction processors component does not exist in the segment, one is created.

"Segment_Tool" searches for a particular instruction processor in an instruction processors component, such as the instruction processors component 212 in the segment 202.

"Segment_Track" searches for track 210 in segment 202.

dwPChannel is a channel identifier parameter that identifies an audio data channel in an audio data processing component that the component object having the requested API is associated with. A value of "PChannel_All" indicates a search of all audio data channels in the audio data processing component, such as the performance manager 104 or audio rendition manager 106.

dwBuffer is an audio buffer identifier parameter that identifies a particular audio buffer, such as audio buffers 316 and 318 in the audio buffers component 230. If the dwStage parameter value is "Buffer_DMO" or "Mixin_Buffer_DMO", the audio buffer identifier indicates the audio buffer having the effects processor 320. If the dwStage parameter value is "Buffer" or "Mixin_Buffer", the audio buffer identifier indicates the audio buffer itself.

guidObject is a component class identifier parameter which is a unique identifier for the component object having the requested API, and can be an object class identifier (CLSID) of the component object. A value of "GUID_All_Objects" indicates a search for an object of any class.

dwIndex is an index parameter that indicates a particular component object having the requested API within a list of matching objects. This parameter is not used if the dwStage parameter value is "Buffer" or "Mixin_Buffer" (the parameter value for a particular audio buffer is already indicated by the dwBuffer parameter).

iidInterface is an interface identifier parameter that indicates the interface corresponding to the requested API being searched for.

ppObject is an identifier parameter that indicates a memory address of a reference to the requested programming reference.

The getObject method for the SegmentState interface returns a pointer, or programming reference, to the requested component object API. The method can also return error values to indicate that the requested API was not found. The parameters for the getObject method for the SegmentState interface also have a hierarchical precedence as described above with reference to the AudioPath interface to filter out unwanted component objects when searching for a corresponding component object interface. If a matching component object is located with the parameter search, but the requested API identified by iidInterface cannot be obtained, the method fails and returns an error value.

Table 1 below shows a relationship of the getObject method parameters, and which of the parameters are provided to request a programming reference to an API for a particular audio data processing component as identified by a dwStage parameter value. For example, to request a programming reference to an API for a synthesizer component, identified by dwStage parameter value "Port", the method parameters guidObject, dwPChannel, and dwIndex are also provided with the dwStage parameter. Another example is a request for a programming reference to an API for an audio buffer component identified by dwStage parameter value "Buffer". The method parameters dwPChannel and dwBuffer are also provided with the dwStage parameter. For some requests for a programming reference to an API, the dwStage parameter (and associated value) is the only method parameter provided, such as for an audio rendition manager identified by dwStage parameter value "AudioPath".

TABLE 1

| dwStage | guidObject | dwPChannel | dwBuffer | dwIndex |
|---|---|---|---|---|
| AudioPath | | | | |
| AudioPath_Graph | | | | |
| AudioPath_Tool | guidObject | dwPChannel | | dwIndex |
| Performance | | | | |
| Performance_Graph | | | | |
| Performance_Tool | guidObject | dwPChannel | | dwIndex |
| Segment | | | | |
| Segment_Track | guidObject | | | dwIndex |
| Segment_Graph | | | | |
| Segment_Tool | guidObject | dwPChannel | | dwIndex |
| Port | guidObject | dwPChannel | | dwIndex |
| Buffer | | dwPChannel | dwBuffer | |
| Buffer_DMO | guidObject | dwPChannel | dwBuffer | dwIndex |
| Mixin_Buffer | | | dwBuffer | |
| Mixin_Buffer_DMO | guidObject | | dwBuffer | dwIndex |

Audio Buffer Interface Method

A Buffer interface (IDirectSoundBuffer8) represents an audio buffer 316 or 318 in the audio buffers component 230. The Buffer interface includes the getObject method and accepts the following parameters to request a pointer, or programming reference, to an API for an effects processor 320 associated with an audio buffer:

rguidObject is a component class identifier parameter which is a unique reference identifier for the component object having the requested API, and can be an object class identifier (CLSID) of the component object. A value of "GUID_All_Objects" indicates a search for an object of any class.

dwIndex is an index parameter that indicates a particular component object having the requested API within a list of matching objects.

rguidInterface is an interface identifier parameter that indicates the interface corresponding to the requested API being searched for.

ppObject is an identifier parameter that indicates a memory address of a reference to the requested programming reference.

The getObject method for the Buffer interface returns a pointer, or programming reference, to the requested component object API. The method can also return error values to indicate that the requested API was not found. When a requesting application program is returned a pointer to the requested effects processor API, the application program can modify the effects processor via interface methods, such as by changing the position of a sound in real-time to position the sound source in relation to a video entity's position.

File Format and Component Instantiation

Configuration information for an audio rendition manager object and the associated component objects is stored in a file format such as the Resource Interchange File Format (RIFF). A RIFF file includes a file header that contains data describing the object followed by what are known as "chunks." Each of the chunks following a file header corresponds to a data item that describes the object, and each chunk consists of a chunk header followed by actual chunk data. A chunk header specifies an object class identifier (CLSID) that can be used for creating an instance of the object. Chunk data consists of the data to define the corresponding data item. Those skilled in the art will recognize that an extensible markup language (XML) or other hierarchical file format can be used to implement the component objects and the audio generation systems described herein.

A RIFF file for a mapping component and a synthesizer component has configuration information that includes identifying the synthesizer technology designated by source input audio instructions. An audio source can be designed to play on more than one synthesis technology. For example, a hardware synthesizer can be designated by some audio instructions from a particular source, for performing certain musical instruments for example, while a wavetable synthesizer in software can be designated by the remaining audio instructions for the source.

The configuration information defines the synthesizer channels and includes both a synthesizer channel-to-buffer assignment list and a buffer configuration list stored in the synthesizer configuration data. The synthesizer channel-to-buffer assignment list defines the synthesizer channel sets and the buffers that are designated as the destination for audio wave data output from the synthesizer channels in the channel set. The assignment list associates buffers according to buffer global unique identifiers (GUIDs) which are defined in the buffer configuration list.

Defining the buffers by buffer GUIDs facilitates the synthesizer channel-to-buffer assignments to identify which buffer will receive audio wave data from a synthesizer channel. Defining buffers by buffer GUIDs also facilitates sharing resources. More than one synthesizer can output audio wave data to the same buffer. When a buffer is instantiated for use by a first synthesizer, a second synthesizer can output audio wave data to the buffer if it is available to receive data input. The buffer configuration list also maintains flag indicators that indicate whether a particular buffer can be a shared resource or not.

The configuration information also includes identifying whether a synthesizer channel ten will be designated as a drums channel. Typically, MIDI devices such as a synthesizer designates MIDI channel ten for drum instruments that map to it. However, some MIDI devices do not. The mapping component identifies whether a synthesizer channel ten in a particular channel group will be designated for drum instruments when instantiated. The configuration information also includes a configuration list that contains the information to allocate and map audio instruction input channels to synthesizer channels.

The RIFF file also has configuration information for a multi-bus component and an audio buffers component that includes data describing an audio buffer object in terms of a buffer GUID, a buffer descriptor, the buffer function and associated effects (i.e., audio processors), and corresponding logical bus identifiers. The buffer GUID uniquely identifies each buffer. A buffer GUID can be used to determine which synthesizer channels connect to which buffers. By using a unique buffer GUID for each buffer, different synthesizer channels, and channels from different synthesizers, can connect to the same buffer or uniquely different ones, whichever is preferred.

The instruction processors, mapping, synthesizer, multi-bus, and audio buffers component configurations support COM interfaces for reading and loading the configuration data from a file. To instantiate the components, an application program instantiates a component using a COM function. The components of the audio generation systems described herein are implemented with COM technology and each component corresponds to an object class and has a corresponding object type identifier or CLSID (class identifier). A component object is an instance of a class and the instance is created from a CLSID using a COM function called CoCreateInstance. However, those skilled in the art will recognize that the audio generation systems and the various components described herein are not limited to a COM implementation, or to any other specific programming technique.

The application program then calls a load method for the object and specifies a RIFF file stream. The object parses the RIFF file stream and extracts header information. When it reads individual chunks, it creates the object components, such as synthesizer channel group objects and corresponding synthesizer channel objects, and mapping channel blocks and corresponding mapping channel objects, based on the chunk header information.

Audio sources and audio generation systems having audio rendition managers can be pre-authored which makes it easy to develop complicated audio representations and generate music and sound effects without having to create and incorporate specific programming code for each instance of an audio rendition of a particular audio source. An audio rendition manager and the associated component objects can be instantiated from an audio rendition manager configuration data file.

Alternatively, a segment data file can contain audio rendition manager configuration data within its file format representation to instantiate an audio rendition manager. When a segment is loaded from a segment data file, an audio rendition manager is created. Upon playback, the audio rendition manager defined by the configuration data is automatically created and assigned to the segment. When the audio corresponding to a segment component is rendered, it releases the system resources allocated to instantiate the audio rendition manager and the associated components.

Methods Pertaining to an Exemplary Audio Generation System

Although the invention has been described above primarily in terms of its components and their characteristics, the invention also includes methods performed by a computer or similar device to implement the features described above.

Figure 4:
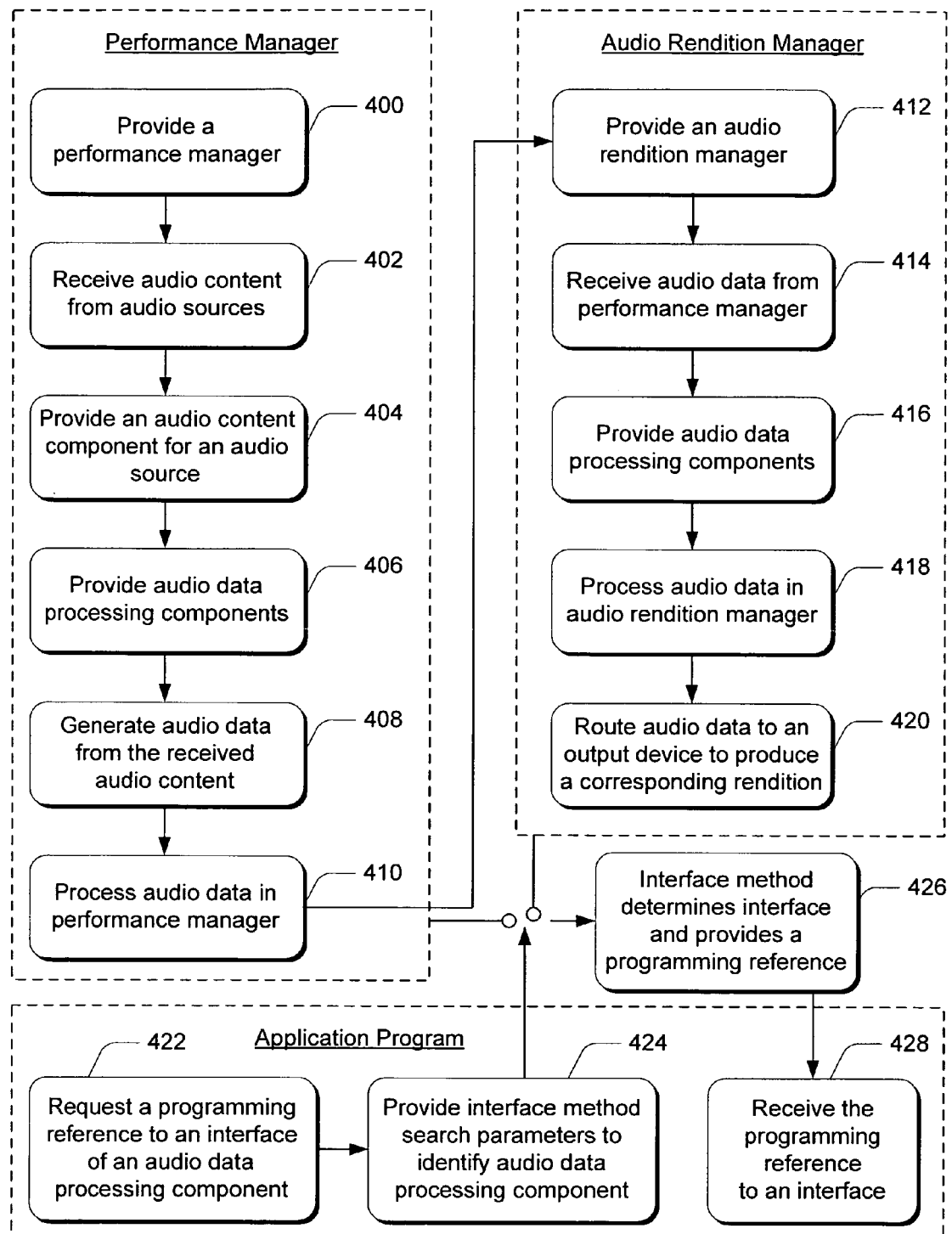
FIG. 4 is a flow diagram of a method for an audio generation system.

FIG. 4 illustrates a method for implementing the invention described herein. The order in which the method is described is not intended to be construed as a limitation. Furthermore, the method can be implemented in any suitable hardware, software, firmware, or combination thereof.

At block 400, a performance manager component is instantiated. The performance manager can be instantiated by an application program as part of an audio generation system that produces an audio representation to correlate with a video presentation. Furthermore, the performance manager can be instantiated as a component object having an interface and interface methods that are callable by a software component. At block 402, audio content is received from one or more audio sources. The audio sources provide digital samples of audio data such as from a wave file, message-based data such as from a MIDI file or a pre-authored segment file, or an audio sample such as a Downloadable Sound (DLS).

At block 404, an audio content component is instantiated that corresponds to an audio source from which audio content is received. An example of an audio content component is the segment component in the performance manager. The segment can be instantiated as a component object by the performance manager and have an interface and interface methods that are callable by a software component. Additionally, the segment component can be created from a file representation that is loaded and stored in a segment configuration object that maintains the configuration information.

At block 406, audio data processing components are instantiated in the performance manager. The audio data processing components include instruction processor components and an output processor. The audio data processing components can be instantiated by the performance manager as component objects having an interface and interface methods that are callable by a software component. At block 408, audio data is generated from the received audio content by the segment component. The segment component has segment tracks that generate the audio data as event instructions when the performance manager calls the segment which in turn calls the segment tracks.

At block 410, the audio data is processed in the performance manager with the performance manager audio data processing components. For example, the output processor component processes the event instructions (audio data) to produce audio data in the form of audio instructions, such as MIDI formatted instructions.

At block 412, an audio rendition manager component is instantiated. The audio rendition manager can be instantiated by an application program or the performance manager as part of an audio generation system that produces an audio representation to correlate with a video presentation. Furthermore, the audio rendition manager can be instantiated as a component object having an interface and interface methods that are callable by a software component. Additionally, the audio rendition manager can be created from a file representation that is loaded and stored in a audio rendition manager configuration object that maintains the configuration information.

At block 414, the audio rendition manager receives the audio data from the performance manager. At block 416, audio data processing components are instantiated in the audio rendition manager. The audio data processing components in the audio rendition manager include instruction processor components, a synthesizer component, a mapping component, a multi-bus component, and an audio buffers component. The audio data processing components can be instantiated by the audio rendition manager as component objects having an interface and interface methods that are callable by a software component.

At block 418, the audio data is processed in the audio rendition manager with the audio data processing components. For example, the synthesizer component receives the audio data and produces audio sound wave data that is then routed to audio buffers in the audio buffers component. At block 420, the output of the audio buffers is routed to an external device to produce an audible rendition corresponding to the audio data processed by the various audio data processing components in the performance manager and audio rendition manager.

At block 422, a software component, such as an application program, requests a programming reference (e.g., a pointer) to an object interface of one of the audio data processing components in either the performance manager or audio rendition manager. The software component calls an interface method of a performance manager interface, or an audio rendition manager interface, and provides one or more interface method search parameters (at block 424) to identify which object interface of which audio data processing component the programming reference is being requested. The software component can request a programming reference to an object interface of one of the audio data processing components at any time during the method as described in blocks 400 through 420.

At block 426, the respective interface method associated with the performance manager or audio rendition manager determines the object interface of the particular audio data processing component and provides a programming reference (e.g., a pointer) to the particular object interface. At block 428, the application program receives the programming reference from the performance manager or audio rendition manager interface method.

Exemplary Computing System and Environment

Figure 5:
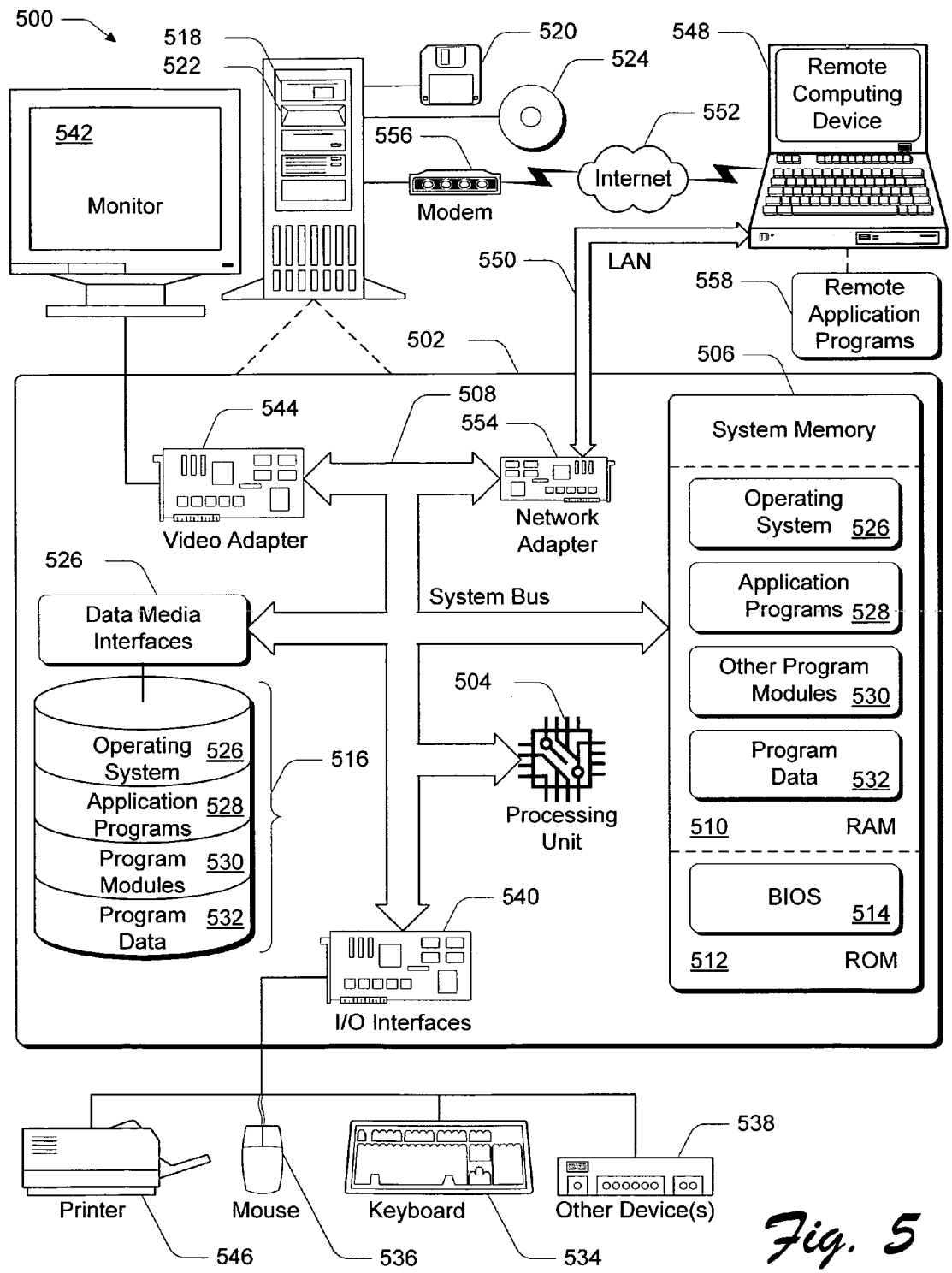
FIG. 5 is a diagram of computing systems, devices, and components in an environment that can be used to implement the invention described herein.

FIG. 5 illustrates an example of a computing environment 500 within which the computer, network, and system architectures described herein can be either fully or partially implemented. Exemplary computing environment 500 is only one example of a computing system and is not intended to suggest any limitation as to the scope of use or functionality of the network architectures. Neither should the computing environment 500 be interpreted as having any dependency or requirement relating to any one or combination of components illustrated in the exemplary computing environment 500.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

An audio generation system having audio data processing components may be described in the general context of computer-executable instructions, such as program modules, being executed by a computer. Generally, program modules include routines, programs, objects, components, data structures, etc. that perform particular tasks or implement particular abstract data types. An audio generation system having audio data processing components may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing system in the form of a computer 502. The components of computer 502 can include, by are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 502 typically includes a variety of computer readable media. Such media can be any available media that is accessible by computer 502 and includes both volatile and non-volatile media, removable and non-removable media. The system memory 506 includes computer readable media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 can also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of an audio generation system having audio data processing components.

Computer system 502 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 604 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer system 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computer system 502, and are executed by the data processor(s) of the computer.

Conclusion

The getObject interface method allows a software component, such as an application program, to access and control audio data processing component objects within audio generation system components. An application program can obtain a pointer, or programming reference, to any object interface on any component object in a performance manager, or in an audio rendition manager, while the audio data is being processed. When an application program creates an audio representation component that then creates audio data processing components to process and render audio data to create an audio representation corresponding to a video presentation, the application program creating the audio representation component can directly access the audio data processing components that are created by the audio representation component.

Although embodiments of accessing audio processing components in an audio generation system have been described in language specific to structural features and/or methods, it is to be understood that the subject of the appended claims is not necessarily limited to the specific features or methods described. Rather, the specific features and methods are disclosed as exemplary implementations of the methods and systems for accessing audio processing components in an audio generation system.

The invention claimed is:

1. One or more computer readable media comprising computer executable instructions that, when executed, direct an audio generation system to:

generate an audio rendition manager having audio data processing components to process audio data, the audio data processing components being instantiated by the audio rendition manager as component objects having one or more interfaces that are callable by an application program;

receive a request from the application program for a programming reference corresponding to an interface of one of the instantiated audio data processing components, the request from the application program being a call to an interface method of the audio rendition manager to provide one or more interface method search parameters; and return the requested programming reference to the application program.

2. One or more computer readable media as recited in claim 1, further comprising computer executable instructions that, when executed, direct the audio generation system to return a memory address of a reference to the requested programming reference.

3. One or more computer readable media as recited in claim 1, further comprising computer executable instructions that, when executed, direct the audio generation system to generate the audio rendition manager as a component object having one or more interface methods that are callable by the application program.

4. One or more computer readable media as recited in claim 1, further comprising computer executable instructions that, when executed, direct the audio generation system to determine the requested programming reference with the audio rendition manager interface method.

5. One or more computer readable media as recited in claim 1, further comprising computer executable instructions that, when executed, direct the audio generation system to determine the requested programming reference with the audio rendition manager interface method in accordance with the one or more interface method search parameters.

6. One or more computer readable media as recited in claim 1, further comprising computer executable instructions that, when executed, direct the audio generation system to determine the requested programming reference with an interface method search parameter that identifies the particular one of the instantiated audio data processing components.

7. One or more computer readable media as recited in claim 1, further comprising computer executable instructions that, when executed, direct the audio generation system to determine the requested programming reference with an interface method search parameter that is a component identifier of one of the instantiated audio data processing components, the search parameter having a value that identifies said component.

8. One or more computer readable media as recited in claim 1, further comprising computer executable instructions that, when executed, direct the audio generation system to determine the requested programming reference with an interface method search parameter that is a component identifier of one of the instantiated audio data processing components, the search parameter having a value that identifies said component as a component object having one or more audio data modifying components.

9. One or more computer readable media as recited in claim 1, further comprising computer executable instructions that, when executed, direct the audio generation system to determine the requested programming reference with an interface method search parameter that is a component identifier of one of the instantiated audio data processing components, the search parameter having a value that identifies said component as an audio sound wave data mixing component.

10. One or more computer readable media as recited in claim 1, further comprising computer executable instructions that, when executed, direct the audio generation system to determine the requested programming reference with the one or more interface method search parameters that include:

a component identifier of one of the instantiated audio data processing components, the search parameter having a value that identifies said component as an audio buffer component that receives audio sound wave data from a plurality of audio buffer components; and an audio buffer identifier that identifies the audio buffer component.

11. One or more computer readable media as recited in claim 1, further comprising computer executable instructions that, when executed, direct the audio generation system to determine the requested programming reference with the one or more interface method search parameters that include:

a component identifier of one of the instantiated audio data processing components, the search parameter having a value that identifies said component as an audio buffer component;

an audio buffer identifier that identifies the audio buffer component; and an audio data channel identifier that identifies an audio data channel corresponding to the audio buffer component.

12. One or more computer readable media as recited in claim 1, further comprising computer executable instructions that, when executed, direct the audio generation system to determine the requested programming reference with the one or more interface method search parameters that include:

a component identifier of one of the instantiated audio data processing components, the search parameter having a value that identifies said component as an audio data modifying component;

an audio data channel identifier that identifies an audio data channel corresponding to the audio data modifying component;

a component class identifier that identifies a component class corresponding to the audio data modifying component; and an index parameter that identifies the audio data modifying component in a group of audio data modifying components that each correspond to the audio data channel and to the audio data modifying component class.

13. One or more computer readable media as recited in claim 1, further comprising computer executable instructions that, when executed, direct the audio generation system to determine the requested programming reference with the one or more interface method search parameters that include:

a component identifier of one of the instantiated audio data processing components, the search parameter having a value that identifies said component as a synthesizer component;

an audio data channel identifier that identifies an audio data channel corresponding to the synthesizer component;

a component class identifier that identifies a component class corresponding to the synthesizer component; and an index parameter that identifies the synthesizer component in a group of synthesizer components that each correspond to the audio data channel and to the synthesizer component class.

14. One or more computer readable media as recited in claim 1, further comprising computer executable instructions that, when executed, direct the audio generation system to determine the requested programming reference with the one or more interface method search parameters that include:

a component identifier of one of the instantiated audio data processing components, the search parameter having a value that identifies said component as an effects processor component in an audio buffer component that receives audio sound wave data from a plurality of audio buffer components;

an audio buffer identifier that identifies the audio buffer component corresponding to the effects processor component;

a component class identifier that identifies a component class corresponding to the effects processor component; and an index parameter that identifies the effects processor component in a group of effects processor components that each correspond to the audio buffer component and to the effects processor component class.

15. One or more computer readable media as recited in claim 1, further comprising computer executable instructions that, when executed, direct the audio generation system to determine the requested programming reference with the one or more interface method search parameters that include:

a component identifier of one of the instantiated audio data processing components, the search parameter having a value that identifies said component as an effects processor component in an audio buffer component;

an audio buffer identifier that identifies the audio buffer component corresponding to the effects processor component;

an audio data channel identifier that identifies an audio data channel corresponding to the effects processor component;

a component class identifier that identifies a component class corresponding to the effects processor component; and an index parameter that identifies the effects processor component in a group of effects processor components that each correspond to the audio buffer component, to the audio data channel, and to the effects processor component class.

16. An audio generation system, comprising:

means for generating an audio rendition manager having audio data processing components to process audio data, the audio data processing components being instantiated by the audio rendition manager as component objects having one or more interfaces that are callable by an application program;

means for receiving a request from the application program for a programming reference corresponding to an interface of one of the instantiated audio data processing components, the request from the application program being a call to an interface method of the audio rendition manager to provide one or more interface method search parameters; and means for returning the requested programming reference to the application program.

17. An audio generation system as recited in claim 16, further comprising means for returning a memory address of a reference to the requested programming reference.

18. An audio generation system as recited in claim 16, further comprising means for generating the audio rendition manager as a component object having one or more interface methods that are callable by the application program.

19. An audio generation system as recited in claim 16, further comprising means for determining the requested programming reference with the audio rendition manager interface method.

20. An audio generation system as recited in claim 16, further comprising means for determining the requested programming reference with the audio rendition manager interface method in accordance with the one or more interface method search parameters.

21. An audio generation system as recited in claim 16, further comprising means for determining the requested programming reference with an interface method search parameter that identifies the particular one of the instantiated audio data processing components.

22. An audio generation system as recited in claim 16, further comprising means for determining the requested programming reference with an interface method search parameter that is a component identifier of one of the instantiated audio data processing components, the search parameter having a value that identifies said component.

23. An audio generation system as recited in claim 16, further comprising means for determining the requested programming reference with an interface method search parameter that is a component identifier of one of the instantiated audio data processing components, the search parameter having a value that identifies said component as a component object having one or more audio data modifying components.

24. An audio generation system as recited in claim 16, further comprising means for determining the requested programming reference with an interface method search parameter that is a component identifier of one of the instantiated audio data processing components, the search parameter having a value that identifies said component as an audio sound wave data mixing component.

25. An audio generation system as recited in claim 16, further comprising means for determining the requested programming reference with the one or more interface method search parameters that include:
   a component identifier of one of the instantiated audio data processing components, the search parameter having a value that identifies said component as an audio buffer component that receives audio sound wave data from a plurality of audio buffer components; and
   an audio buffer identifier that identifies the audio buffer component.

26. An audio generation system as recited in claim 16, further comprising means for determining the requested programming reference with the one or more interface method search parameters that include:
   a component identifier of one of the instantiated audio data processing components, the search parameter having a value that identifies said component as an audio buffer component;
   an audio buffer identifier that identifies the audio buffer component; and
   an audio data channel identifier that identifies an audio data channel corresponding to the audio buffer component.

27. An audio generation system as recited in claim 16, further comprising means for determining the requested programming reference with the one or more interface method search parameters that include:
   a component identifier of one of the instantiated audio data processing components, the search parameter having a value that identifies said component as an audio data modifying component;
   an audio data channel identifier that identifies an audio data channel corresponding to the audio data modifying component;
   a component class identifier that identifies a component class corresponding to the audio data modifying component; and
   an index parameter that identifies the audio data modifying component in a group of audio data modifying components that each correspond to the audio data channel and to the audio data modifying component class.

28. An audio generation system as recited in claim 16, further comprising means for determining the requested programming reference with the one or more interface method search parameters that include:
   a component identifier of one of the instantiated audio data processing components, the search parameter having a value that identifies said component as a synthesizer component;
   an audio data channel identifier that identifies an audio data channel corresponding to the synthesizer component;
   a component class identifier that identifies a component class corresponding to the synthesizer component; and
   an index parameter that identifies the synthesizer component in a group of synthesizer components that each correspond to the audio data channel and to the synthesizer component class.

29. An audio generation system as recited in claim 16, further comprising means for determining the requested programming reference with the one or more interface method search parameters that include:
   a component identifier of one of the instantiated audio data processing components, the search parameter having a value that identifies said component as an effects processor component in an audio buffer component that receives audio sound wave data from a plurality of audio buffer components;
   an audio buffer identifier that identifies the audio buffer component corresponding to the effects processor component;
   a component class identifier that identifies a component class corresponding to the effects processor component; and
   an index parameter that identifies the effects processor component in a group of effects processor components that each correspond to the audio buffer component and to the effects processor component class.

30. An audio generation system as recited in claim 16, further comprising means for determining the requested programming reference with the one or more interface method search parameters that include:
   a component identifier of one of the instantiated audio data processing components, the search parameter having a value that identifies said component as an effects processor component in an audio buffer component;
   an audio buffer identifier that identifies the audio buffer component corresponding to the effects processor component;
   an audio data channel identifier that identifies an audio data channel corresponding to the effects processor component;
   a component class identifier that identifies a component class corresponding to the effects processor component; and
   an index parameter that identifies the effects processor component in a group of effects processor components that each correspond to the audio buffer component, to the audio data channel, and to the effects processor component class.

31. One or more computer readable media comprising computer executable instructions that, when executed, direct an audio generation system to:

generate a performance manager as an audio data processing component having an interface that is callable by an application program;

instantiate audio data processing components to process audio data, each of the audio data processing components being instantiated as a component object having an interface that is callable by the application program, wherein the audio data processing components include an audio content component that generates the audio data, and an audio rendition manager corresponding to an audio rendition and processing the audio data to render the corresponding audio rendition;

receive a request from the application program for a programming reference corresponding to an interface of one of the audio data processing components, the request from the application program being a call to an interface method of the audio content component to provide one or more interface method search parameters; and return the requested programming reference to the application program.

32. One or more computer readable media as recited in claim 31, further comprising computer executable instructions that, when executed, direct the audio generation system to return a memory address of a reference to the requested programming reference.

33. One or more computer readable media as recited in claim 31, further comprising computer executable instructions that, when executed, direct the audio generation system to determine the requested programming reference with the audio content component interface method.

34. One or more computer readable media as recited in claim 31, further comprising computer executable instructions that, when executed, direct the audio generation system to determine the requested programming reference with the audio content component interface method in accordance with the one or more interface method search parameters.

35. One or more computer readable media as recited in claim 31, further comprising computer executable instructions that, when executed, direct the audio generation system to determine the requested programming reference with an interface method search parameter that identifies the particular one of the audio data processing components.

36. One or more computer readable media as recited in claim 31, further comprising computer executable instructions that, when executed, direct the audio generation system to determine the requested programming reference with an interface method search parameter that is a component identifier of one of the audio data processing components, the search parameter having a value that identifies said component.

37. One or more computer readable media as recited in claim 31, further comprising computer executable instructions that, when executed, direct the audio generation system to determine the requested programming reference with an interface method search parameter that is a component identifier of one of the audio data processing components, the search parameter having a value that identifies the performance manager.

38. One or more computer readable media as recited in claim 31, further comprising computer executable instructions that, when executed, direct the audio generation system to determine the requested programming reference with an interface method search parameter that is a component identifier of one of the audio data processing components, the search parameter having a value that identifies the audio rendition manager.

39. One or more computer readable media as recited in claim 31, further comprising computer executable instructions that, when executed, direct the audio generation system to determine the requested programming reference with an interface method search parameter that is a component identifier of one of the audio data processing components, the search parameter having a value that identifies the audio content component.

40. One or more computer readable media as recited in claim 31, further comprising computer executable instructions that, when executed, direct the audio generation system to determine the requested programming reference with an interface method search parameter that is a component identifier of one of the audio data processing components, the search parameter having a value that identifies said component as an audio data processing component having one or more audio data modifying components.

41. One or more computer readable media as recited in claim 31, further comprising computer executable instructions that, when executed, direct the audio generation system to determine the requested programming reference with the one or more interface method search parameters that include:

a component identifier of one of the audio data processing components, the search parameter having a value that identifies said component as an audio data modifying component;

an audio data channel identifier that identifies an audio data channel corresponding to the audio data modifying component;

a component class identifier that identifies a component class corresponding to the audio data modifying component; and an index parameter that identifies the audio data modifying component in a group of audio data modifying components that each correspond to the audio data channel and to the audio data modifying component class.

42. One or more computer readable media as recited in claim 31, further comprising computer executable instructions that, when executed, direct the audio generation system to determine the requested programming reference with the one or more interface method search parameters that include:

a component identifier of one of the audio data processing components, the search parameter having a value that identifies said component as an audio data processing component in the audio content component that said generates the audio data;

a component class identifier that identifies a component class corresponding to the audio data processing component in the audio content component; and an index parameter that identifies the audio data processing component in a group of audio data processing components that each correspond to the component class.

43. An audio generation system, comprising:

means for generating a performance manager as an audio data processing component having an interface that is callable by an application program;

means for instantiating audio data processing components to process audio data, each of the audio data processing components being instantiated as a component object having an interface that is callable by the application program, wherein the audio data processing components include an audio content component that generates the audio data, and an audio rendition manager corresponding to an audio rendition and processing the audio data to render the corresponding audio rendition;

means for receiving a request from the application program for a programming reference corresponding to an interface of one of the audio data processing components, the request from the application program being a call to an interface method of the audio content component to provide one or more interface method search parameters; and means for returning the requested programming reference to the application program.

44. An audio generation system as recited in claim 43, further comprising means for returning a memory address of a reference to the requested programming reference.

45. An audio generation system as recited in claim 43, further comprising means for determining the requested programming reference with the audio content component interface method.

46. An audio generation system as recited in claim 43, further comprising means for determining the requested programming reference with the audio content component interface method in accordance with the one or more interface method search parameters.

47. An audio generation system as recited in claim 43, further comprising means for determining the requested programming reference with an interface method search parameter that identifies the particular one of the audio data processing components.

48. An audio generation system as recited in claim 43, further comprising means for determining the requested programming reference with an interface method search parameter that is a component identifier of one of the audio data processing components, the search parameter having a value that identifies said component.

49. An audio generation system as recited in claim 43, further comprising means for determining the requested programming reference with an interface method search parameter that is a component identifier of one of the audio data processing components, the search parameter having a value that identifies the performance manager.

50. An audio generation system as recited in claim 43, further comprising means for determining the requested programming reference with an interface method search parameter that is a component identifier of one of the audio data processing components, the search parameter having a value that identifies the audio rendition manager.

51. An audio generation system as recited in claim 43, further comprising means for determining the requested programming reference with an interface method search parameter that is a component identifier of one of the audio data processing components, the search parameter having a value that identifies the audio content component.

52. An audio generation system as recited in claim 43, further comprising means for determining the requested programming reference with an interface method search parameter that is a component identifier of one of the audio data processing components, the search parameter having a value that identifies said component as an audio data processing component having one or more audio data modifying components.

53. An audio generation system as recited in claim 43, further comprising means for determining the requested programming reference with the one or more interface method search parameters that include:

a component identifier of one of the audio data processing components, the search parameter having a value that identifies said component as an audio data modifying component;

an audio data channel identifier that identifies an audio data channel corresponding to the audio data modifying component;

a component class identifier that identifies a component class corresponding to the audio data modifying component; and an index parameter that identifies the audio data modifying component in a group of audio data modifying components that each correspond to the audio data channel and to the audio data modifying component class.

54. An audio generation system as recited in claim 43, further comprising means for determining the requested programming reference with the one or more interface method search parameters that include:

a component identifier of one of the audio data processing components, the search parameter having a value that identifies said component as an audio data processing component in the audio content component that said generates the audio data;

a component class identifier that identifies a component class corresponding to the audio data processing component in the audio content component; and an index parameter that identifies the audio data processing component in a group of audio data processing components that each correspond to the component class.

55. One or more computer readable media comprising computer executable instructions that, when executed, direct an audio generation system to:

generate an audio rendition manager having audio data processing components to process audio data;

request a reference corresponding to an interface of one of the audio data processing components, the audio rendition manager receiving the request and determining the requested reference, the audio rendition manager further receiving the request as a call to an interface method of the audio rendition manager to provide one or more interface method search parameters; and receive the requested reference from the audio rendition manager.

56. One or more computer readable media as recited in claim 55, further comprising computer executable instructions that, when executed, direct the audio generation system to receive a memory address of a reference identifier that identifies the requested reference.

57. One or more computer readable media as recited in claim 55, further comprising computer executable instructions that, when executed, direct the audio generation system to call the interface method of the audio rendition manager, and determine the requested reference with the audio rendition manager interface method.

58. One or more computer readable media as recited in claim 55, further comprising computer executable instructions that, when executed, direct the audio generation system to instantiate the audio rendition manager as a component object having one or more interfaces, call the interface method of the audio rendition manager, and determine the requested reference with the audio rendition manager interface method.

59. One or more computer readable media as recited in claim 55, further comprising computer executable instructions that, when executed, direct the audio generation system to determine the requested reference with the audio rendition manager interface method in accordance with the one or more interface method search parameters.

60. One or more computer readable media as recited in claim 55, further comprising computer executable instructions that, when executed, direct the audio generation system to determine the requested reference with an interface method search parameter that identifies the particular one of the audio data processing components.

61. One or more computer readable media as recited in claim 55, further comprising computer executable instructions that, when executed, direct the audio generation system to determine the requested reference with an interface method search parameter that is a component identifier of one of the audio data processing components, the search parameter having a value that identifies said component as an audio buffer component.

62. One or more computer readable media as recited in claim 55, further comprising computer executable instructions that, when executed, direct the audio generation system to determine the requested reference with an interface method search parameter that is a component identifier of one of the audio data processing components, the search parameter having a value that identifies said component as a synthesizer component.

63. An audio generation system, comprising:
  means for generating an audio rendition manager having audio data processing components to process audio data;
  means for requesting a reference corresponding to an interface of one of the audio data processing components, the audio rendition manager receiving the request and determining the requested reference, the audio rendition manager further receiving the request as a call to an interface method of the audio rendition manager to provide one or more interface method search parameters; and
  means for receiving the requested reference from the audio rendition manager.

64. An audio generation system as recited in claim 63, further comprising means for calling the interface method of the audio rendition manager, and means for determining the requested reference with the audio rendition manager interface method.

65. An audio generation system as recited in claim 63, further comprising means for instantiating the audio rendition manager as a component object having one or more interfaces, means for calling the interface method of the audio rendition manager, and means for determining the requested reference with the audio rendition manager interface method.

66. An audio generation system as recited in claim 63, further comprising means for determining the requested reference with the audio rendition manager interface method in accordance with the one or more interface method search parameters.

67. An audio generation system as recited in claim 63, further comprising means for determining the requested reference with an interface method search parameter that identifies the particular one of the audio data processing components.

68. An audio generation system as recited in claim 63, further comprising means for determining the requested reference with an interface method search parameter that is a component identifier of one of the audio data processing components, the search parameter having a value that identifies said component as an audio buffer component.

69. An audio generation system as recited in claim 63, further comprising means for determining the requested reference with an interface method search parameter that is a component identifier of one of the audio data processing components, the search parameter having a value that identifies said component as a synthesizer component.

* * * * *